United States Patent [19]

Gadeken et al.

[11] Patent Number: 5,672,867

[45] Date of Patent: Sep. 30, 1997

[54] METHOD FOR FILTERING GAMMA RAY WELL LOGGING TOOL RESPONSE TO ENHANCE VERTICAL DETAIL WHILE SUPPRESSING STATISTICAL NOISE

[75] Inventors: Larry L. Gadeken, Houston; Larry A. Jacobson, Richmond; Gulamabbas A. Merchant, Houston, all of Tex.

[73] Assignee: Halliburton Logging Services, Inc., Houston, Tex.

[21] Appl. No.: 312,446

[22] Filed: Sep. 26, 1994

Related U.S. Application Data

[63] Continuation of Ser. No. 937,770, Sep. 1, 1992.
[51] Int. Cl.$^6$ ................................................ G01V 5/04
[52] U.S. Cl. ...................... 250/262; 250/269.3; 364/422
[58] Field of Search ................................. 250/262, 269, 250/270; 378/901; 364/422

[56] References Cited

U.S. PATENT DOCUMENTS

| | | | |
|---|---|---|---|
| 4,156,914 | 5/1979 | Westell | 364/515 |
| 4,394,574 | 7/1983 | Grau et al. | 250/262 |
| 4,467,425 | 8/1984 | Schaefer et al. | 364/422 |
| 4,777,428 | 10/1988 | Lundback | 324/57 R |
| 4,786,796 | 11/1988 | Flaum et al. | 250/266 |
| 5,227,972 | 7/1993 | Jacobson | 364/422 |

OTHER PUBLICATIONS

SPWLA 22nd Annual Logging Symposium, Schultz et al., "Applications of Digital Filtering Techniques to Nuclear Well Logs", Jun. 1981, Houston, Tx.

Jan A. Czubek, "Quantitative Interpretation of Gamma–Ray Logs in Presence of Random Noise," Inst. Nucl. Physics, SPWLA 27th Annual Logging Symposium, Jun. 9–13, 1986.

L.J. Paden, et al., "Reduction of Poison Noise in the Gamma–Ray Log," Okla. State Univ. SPWLA 16th Annual Logging Symposium, Jun. 17–20, 1985.

C. Flaum, et al., "Enhanced Vertical Resolution Processing of Dual Detector Gamma–Gamma Density Logs," Schlumberger Well Services, Houston, TX. and Schlumberger–Doll Research, Ridgefield, CT.; SPWLA 28th Annual Symposium, Jun. 29–Jul. 2, 1987.

J. E. Galford, et al., "Enhanced Resolution Processing of Compensated Neutron Logs," SPE 15541, 1966.

Jan. A. Czubek, "New Theory, Possibilities, and Practice in Digital Interpretation of Gamma–Ray Logs," Inst. of Nuclear Physics, SPWLA 15th Annual Logging Symposium, May 6–9, 1973.

Ping Sheng, et al., "Bayesian Deconvolution of Gamma–Ray Logs," Geophysics, vol. 52, No. 11, Nov. 1987, pp. 1535–1546.

A. M. Morland, "Special Log Processing for Thin Zones Using Geological Impulse Response Functions, With Particular Application to Total and Spectral Gamma Ray Logs," The Log Analyst, v. 25, No. 6, p. 23, 1984.

W.D. Lyle, et al., "Deconvolution of Well Log Data—An Innovations Approach," The Log Analyst, v. 28, p. 321, 1987.

C.J. Dios, "Inversion of Well Log Data by Method of Maximum Entropy," 10th European Formation Evaluation Symposium, Paper H, Oct. 1985.

(List continued on next page.)

Primary Examiner—Paul M. Dzierzynski
Assistant Examiner—David Vernen Bruce
Attorney, Agent, or Firm—Arnold, White & Durkee

[57] ABSTRACT

A typical nuclear well logging tool forms a count rate data stream including statistical noise. A robust single pass partially deconvolved smoothing filter matched to the tool response is applied to the count rate data to enhance vertical resolution while minimizing the statistical noise increase. The smoothing filter is partially deconvolved by the application of a three point deconvolution characteristic of the cusp portion of a related cusp function and a box function representative of the tool response.

6 Claims, 5 Drawing Sheets

OTHER PUBLICATIONS

G.L. Mathis, "Smoothing Spectral Gamma Logs: A Simple But Effective Technique," Geophysics, v. 52, No. 3, p. 363, 1987.

L. Jacobson, "A Matched Filter Data Smoothing Algorithm," IEEE Transactions on Nuclear Science, vol. 36, No. 1, pp. 1227–1231.

L. Gadeken, et al., "The Utility of combining Smoothing and Deconvolution in Processing Algorithms for Well Log Data," by L. Gadeken, et al., IEEE Nuclear Science Symposium Proceedings, 1990.

METHOD FOR FILTERING GAMMA RAY WELL LOGGING TOOL RESPONSE TO ENHANCE VERTICAL DETAIL WHILE SUPPRESSING STATISTICAL NOISE

This application is a continuation of application Ser. No. 07/937,770, filed Sep. 1, 1992.

The disclosure of U.S. patent application Ser. No. 408,590 filed Sep. 18, 1989, entitled "MATCHED FILTER DATA SMOOTHING SYSTEM", now U.S. Pat. No. 5,227,972 is incorporated by reference herein its entirety.

BACKGROUND OF THE DISCLOSURE

A typical nuclear well logging tool measures count rate data represented in counts per unit of time, which generally follows a Poisson statistical distribution. The count data is subject to statistical noise. Since the original introduction of such logging tools into routine service in logging oil and gas wells, whether during drilling or after completion, one problem which has persisted is enhancement of vertical spatial resolution while minimizing the statistical noise in the response of the nuclear logging tool. The techniques of the present invention have been applied to modern logging tools which detect gamma rays, and may equally well be applicable to other types of nuclear event detecting tools such as neutron well logging tools.

Ordinarily, such a logging tool is moved along a well borehole at some stage in service, perhaps during completion or during servicing of the cased well. In any case, as the tool is moved along the well, it makes observations or measurements which are subject to statistical noise and a spatial smearing effect due to the finite size of the sensor system. In this invention, the spatial resolution is enhanced and the statistical noise is minimized by applying in a single pass a robust smoothing/deconvolution filter to the data, namely, the measured count rate as a function of depth in the well. This technique takes advantage of all components contributing to the system response and enhances the depth resolution of the tool or system response by partial deconvolution and appropriately matching the filter parameters to the well logging tool response.

BRIEF DESCRIPTION OF THE INVENTION

Briefly, in the present invention, a robust single pass smoothing/deconvolution filter is applied to the count rate data obtained by the logging tool as a function of tool depth in the well borehole. The value of the filter function, which is digitally applied to the unprocessed or raw count rate data in a surface digital processor, is composed of the convolution of an inverse cusp function with a filter based on a Gaussian function representation of the tool parameter response function. The application of such a robust smoothing/deconvolution filter can be surprisingly effective in minimizing statistical noise while enhancing the depth resolution of the data flow from the logging tool. The count rate data is thus formed at the well logging tool, transferred to the surface, and subsequently processed and presented in some suitable fashion as a function of depth.

BRIEF DESCRIPTION OF THE DRAWINGS

So that the manner in which above recited features and advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
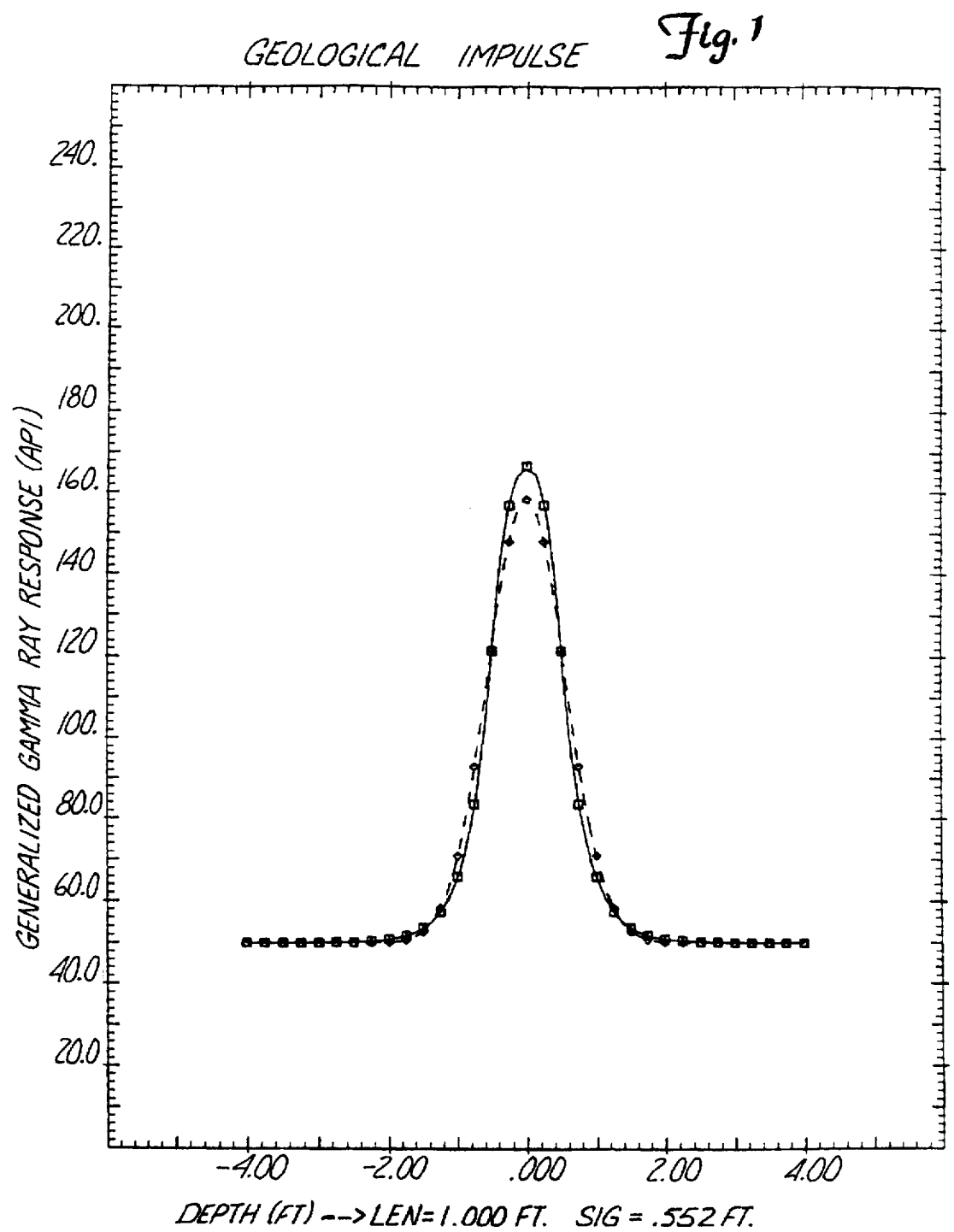
FIG. 1 is a graphical representation showing a comparison of a tool response function obtained from laboratory data and a box plus cusp system response for a gamma ray logging tool having a twelve inch long detector as the data source or detector.

In an article which is entitled "A Matched Filter Data Smoothing Algorithm", IEEE Transactions on Nuclear Science, vol. 36, no. 1, pp. 1227–1231, February 1989, by L. A. Jacobson, a Gaussian system response is generally represented by equation (1):

$$G = \frac{1}{\sigma\sqrt{2\pi}} e^{-\frac{1}{2}(\frac{Z}{\sigma})^2}, Z_0 = 0 \quad (1)$$

In the foregoing paper, the vertical distance relative to the center of the sensor is represented by the symbol Z and σ is the effective width of the Gaussian function.

Additional work has determined that a finite impulse response filter provides excellent results in statistical noise reduction for various kinds of nuclear logging tool data including tools such as a gamma ray spectral tool, gamma ray logging tool and neutron logging tool. Normally, deconvolution leads to an increase in statistical noise but the use of only partial deconvolution achieves a good compromise between noise increase and vertical enhancement. To take a particular example as an illustration of the appropriate analysis, it can be shown that the natural gamma ray tool response can be approximated quite well by the convolution of the cusp function of the type given in equation (2) and a box function of the type given in equation (3) below:

$$C = \frac{1}{\alpha} e^{-\alpha |Z|} \quad (2)$$

$$B = \frac{1}{L}, -\frac{L}{2} \leq Z \leq \frac{L}{2} \quad (3)$$

$$B = 0, Z < -\frac{L}{2}, Z > \frac{L}{2}$$

Equations (2) and (3) represent, respectively and approximately, the scattering properties of the formation through which the gamma rays passes and the characteristic response of the detector itself.

In equation (2) above, α is related to the gamma ray scattering properties of the formation, and as one suitable example, a passive gamma ray tool utilizes a value of 3.0/foot as a suitable approximation. The gamma ray detector length is represented by the symbol L in equation (3).

In a co-pending U.S. patent application Ser. No. 408,590 filed Sep. 18, 1989 and entitled "Matched Filter Data Smoothing System", and which is incorporated herein by reference in its entirety, there is disclosed a single pass matched smoothing filter which is derived from a Gaussian system response function. The techniques for deriving such a matching filter are also disclosed in the aforesaid co-pending U.S. patent application. Such a matched filter does not degrade the depth resolution of the count rate when applied to it.

The vertical response of such a filter, however, can be enhanced and improved using the techniques of the present invention. For example, J. A. Czubek in "New Theory, Possibilities and Practices in Digital Interpretation of Gamma Ray Logs" Transactions in 14th Annual SPWLA Logging Symposium, 1973, observed that a Gaussian impulse response function of a gamma ray detector system could be approximated by the convolution of a cusp and box function such as that of equations (2) and (3) if the cusp function (2) of the equation (2) and the box function L of equation (3) were chosen appropriately to match the form of the Gaussian. The sampled (discretized) cusp function has the nice property that its inverse (deconvolution) is a single three point filter. Thus by applying the three point cusp deconvolution (inverse) filter to data already according to the aforesaid co-pending U.S. patent application, the vertical resolution of such filters data can be actually enhanced. Since such an application of the three point cusp function inverse filter (deconvolution) is only a partial deconvolution of the system response function (approximated by the cusp and box convolution to the Gaussian), the statistical noise is not significantly magnified by this process.

Mathematically, the matched smoothing filter as derived in the aforesaid co-pending U.S. patent application, can be convolved with the inverse cusp filter to produce a final filter which is applied in one pass. In this process, the matched smoothing filter is derived as in the co-pending U.S. application from a Gaussian rather than a box and cusp because it is mathematically more straight forward to do so. The process of the present invention may thus be thought of as a vertical resolution enhance by partial deconvolution. This process is applied in a single pass to the count rate data in a robust, partially deconvolved matched smoothing filter as discussed in "The Utility Of Combining Smoothing and Deconvolution in Processing Algorithms for Well Log Data" by L. L. Gadeken, G. A. Merchant, L. A. Jacobson and C. C. Fu, in IEEE 1990 N.S. Symposium Proceedings.

In light of the foregoing, the first step is to determine an effective Gaussian function width $\sigma$ for equation (1) given above which matches the cusp and box convolution system response for detectors of various detector lengths L. FIG. 1 shows the result of a 12 inch filter (where L=12). The solid line in FIG. 1 is a curve for the cusp and box response while the dash curve in FIG. 1 shows the corresponding effective Gaussian function which is obtained by specifying the full width at half maximum (FWHM)=2.355$\sigma$ which is the same for the two functions shown in that graph.

Figure 2:
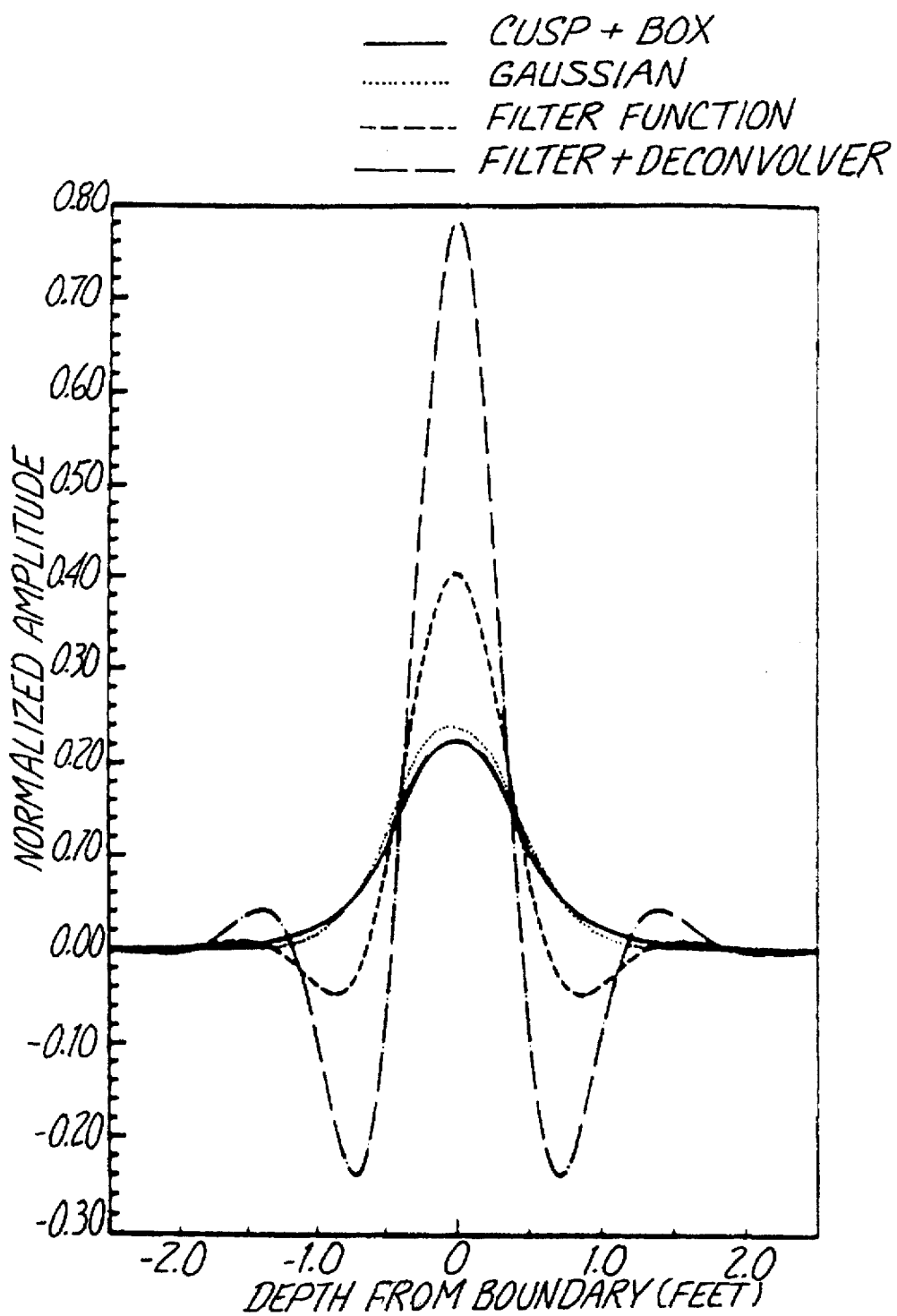
FIG. 2 is a graphical representation of tool response functions and filter functions for a 0.75 foot long gamma ray sensor having approximately 1 foot spatial resolution.

FIG. 2 shows the compatibility of the Gaussian and box-plus-cusp function similar to FIG. 1. Also, it shows the smoothing filter derived from the Gaussian function alone as well as the smoothing/deconvolution filter wherein the inverse cusp function has been added to provide partial deconvolution. The increase negative side lobes provide the enhanced vertical spatial resolution. Once the smoothing filter which corresponds to this Gaussian is derived according to the co-pending U.S. application, the single cusp function deconvolution filter is convolved with the matched smoothing filter function to derive the robust single pass smoothing filter of the present invention.

Figure 3A:
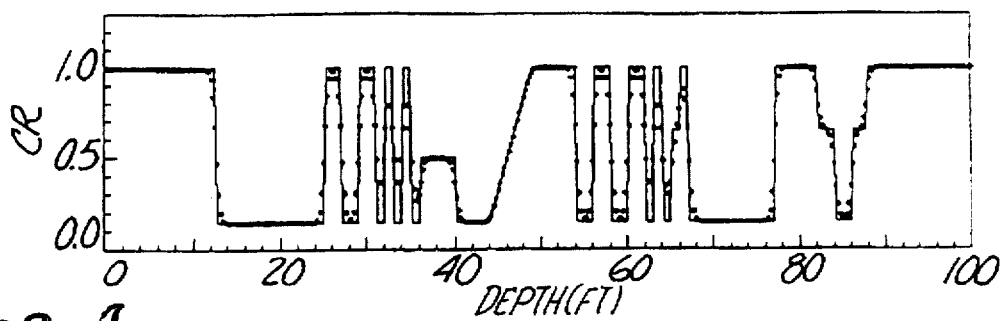
FIGS. 3A, 3B, 3C and 3D, show a smoothing filter function according to the present invention applied to synthetic logging data.
Figure 3B:
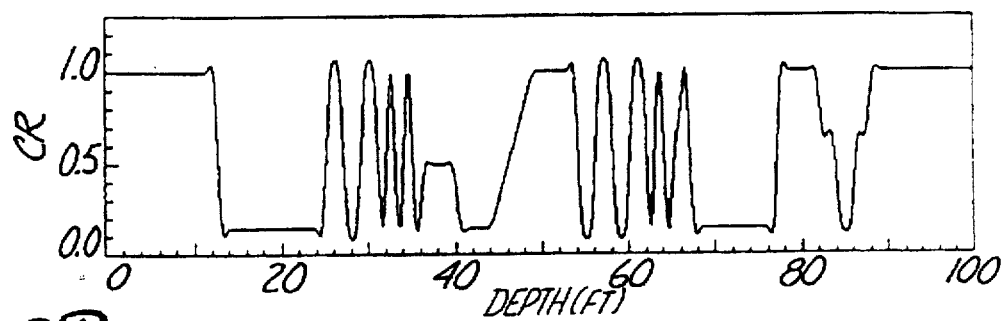
Figure 3C:
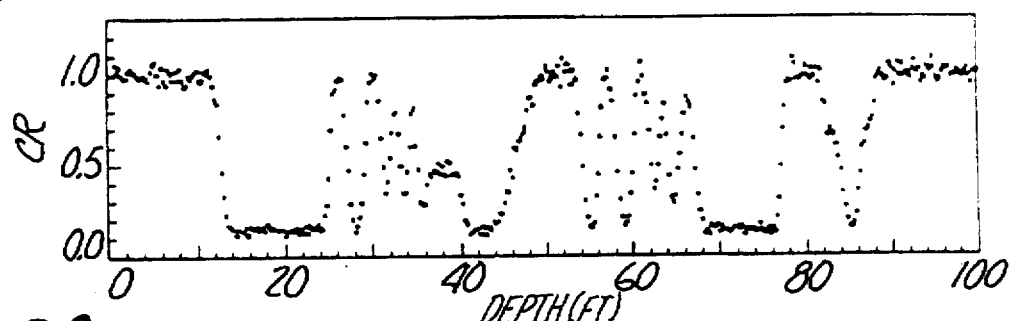
Figure 3D:
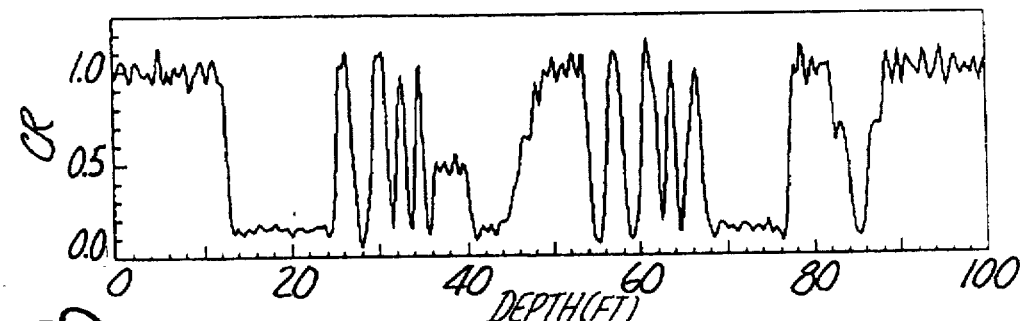

Tests of the smoothing function applied to synthetic data are shown in the separate panels at FIGS. 3A–3D. 3A shows an assumed geological profile in solid line which is smeared by a Gaussian system function having a 1.0 foot FWHM and which is sampled at 0.25 foot intervals. By contrast, FIG. 3B shows the combined smoothing filter/deconvolver having an FWHM of 0.75 foot, and an $\alpha$ of 3.0/foot which is applied to the noise free data of FIG. 3A. FIG. 3C is the sampled data with sampling at 0.25 foot intervals to which the Gaussian distributed statistical noise has been added such that a one $\sigma$ deviation is about 3%. Last of all, FIG. 3D shows the combined smoothing function/deconvolver applied to the noisy data which is shown in FIG. 3C.

Figure 4:
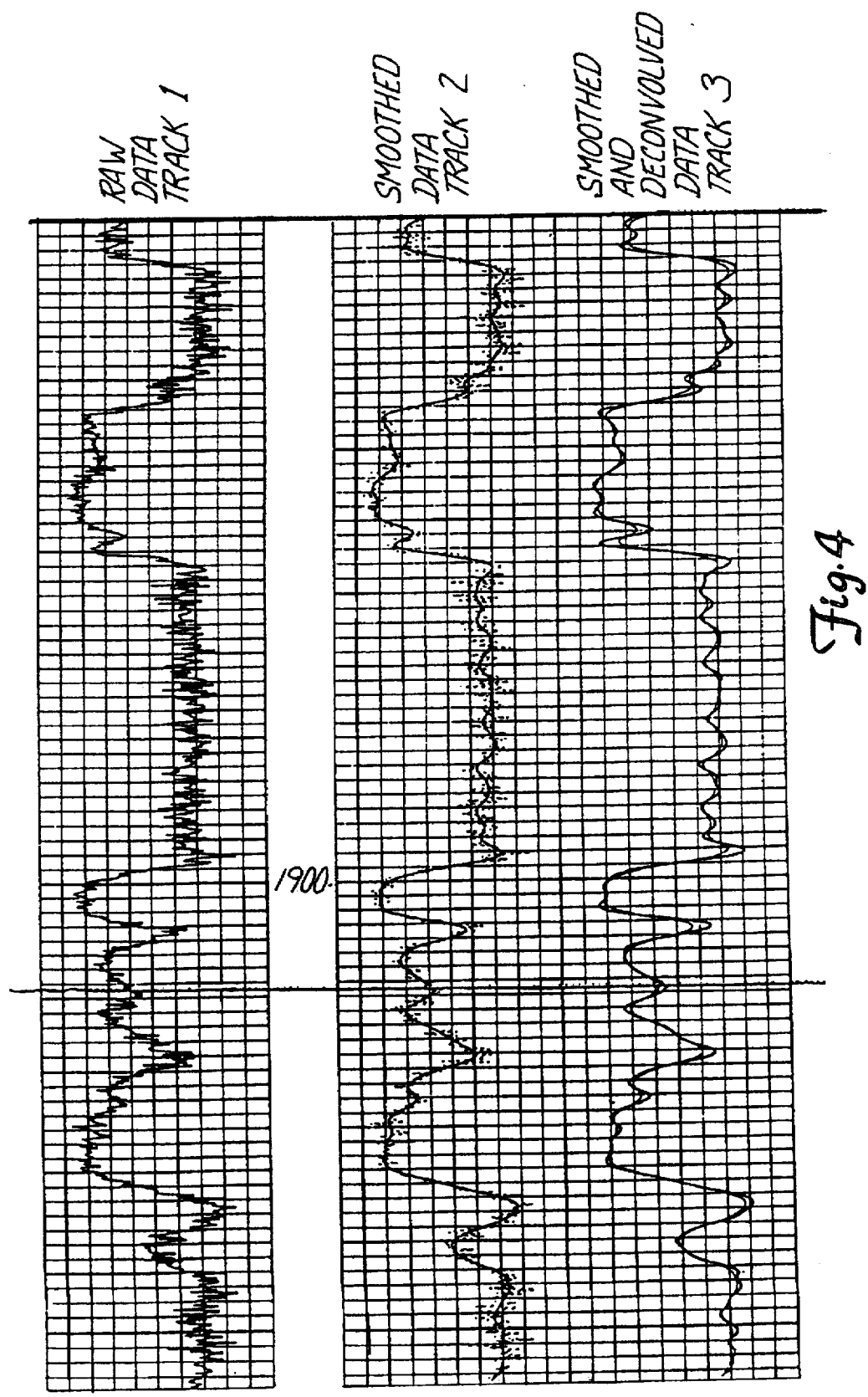
FIG. 4 shows a smoothing filter function according to the present invention applied to actual well logging data for a gamma ray tool having an 8 inch detector.

The robust smoothing and deconvolving filter in accordance with the present disclosure is applied to actual well logging data from a gamma ray logging tool having an eight inch long detector (L=8) which is shown in FIG. 4. The data was sampled at intervals of 0.1 foot in Z at a logging speed of 15 feet per minute. The first track shows the raw data with system and statistical noise included. The second track shows the smoothing filter alone applied to the data from the first track one data overlaid on a dotted curve. The third track in FIG. 4 shows the smoothed and deconvolved curve with the smooth results of track two lightly overlaid as a dotted curve in the third track. Of value, note that the deconvolved curve sharpens the count rate transitions but adds little, if any, additional noise. The foregoing description is typically implemented with the signals which are transferred from a logging tool to the surface at a well head where the data is transferred up a logging cable and is recorded, and is either converted in the field or is processed later.

Figure 5:
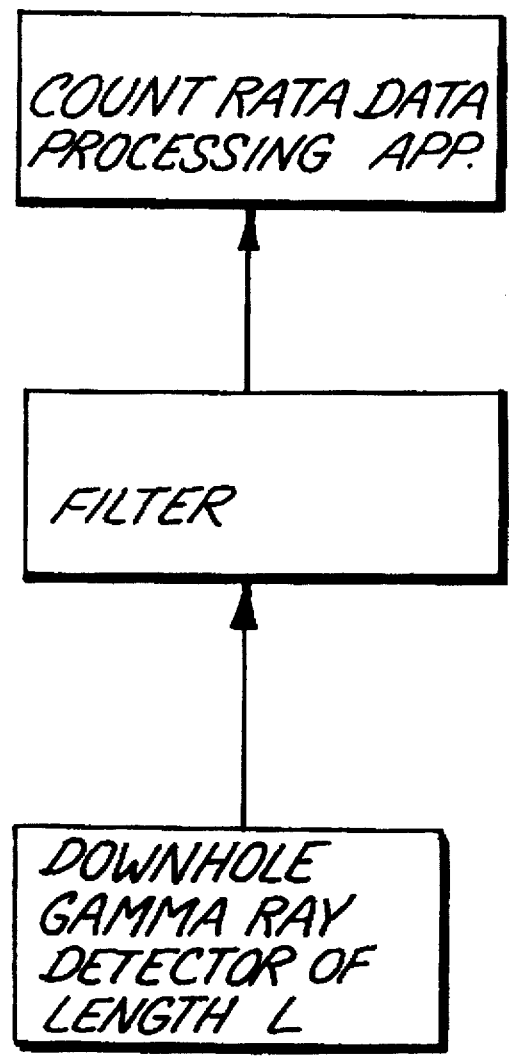
FIG. 5 is a schematic block diagram of a system.

FIG. 5 of the drawings shows a simple block diagram schematic. In it, a gamma ray measuring detector is normally installed in a sonde to be lowered in a well borehole for detection of nuclear events represented by a count rate indication which is subject to a Poisson statistical distribution. FIG. 5 shows the insertion of a filter derived in accordance with the present disclosure. The filtered data stream is then delivered to the surface computer equipment which is used to record the data in a form such as that shown in FIGS. 3 or 4 of the present disclosure. In the ordinary use of the equipment, the filter is installed so that all the data stream flows through the filter in accordance with the present disclosure.

While the foregoing description is directed to the preferred embodiment, the scope of the present invention is determined by the claims which follow:

We claim:

1. A method for enhancing vertical resolution while minimizing the increase in statistical noise in gamma ray logging tool count rate data obtained as a function of depth in a well borehole wherein the method comprises the steps of:

(a) moving a well logging tool having a gamma ray detector along a well borehole and detecting gamma radiation to produce count rate data in the well borehole;

(b) storing the count rate data as a function of depth in the well borehole;

(c) processing a selected depth interval of the count rate data by applying thereto in a single pass a robust smoothing filter and an inverse cusp function filter having a predetermined depth interval associated therewith and wherein said filter smoothes statistical noise fluctuations in the count rate data while the inverse cusp function enhances the essential spatial information of the data;

(d) recording the processed data as a function of tool depth in the well borehole; and (e) repeating steps (c) and (d) to form an output record of processed count rate data for a selected depth interval in the well borehole.

2. The method of claim 1 wherein said robust smoothing filter is derived from a Gaussian function which approximates the convolution of a cusp function C and a box function B.

3. The method of claim 2 wherein said cusp function C is of the form:

$$C = \frac{1}{\alpha} e^{-\alpha |Z|}$$

where Z is the vertical distance relative to the center of the sensor, $\alpha$ is a parameter relating to the gamma ray scattering properties of formations in the vicinity of said tool.

4. The method of claim 3 wherein said box function has the form:

$$B = \frac{1}{L}, -\frac{L}{2} \leq Z \leq \frac{L}{2}$$

$$B = 0, Z < -\frac{L}{2}, Z > \frac{L}{2}$$

where L is the length of the gamma ray detector in said tool, and Z is the vertical distance relative to the center of the detector in said tool.

5. The method of claim 2 wherein the Gaussian function has the form:

$$G = \frac{1}{\sigma \sqrt{2\pi}} e^{-\frac{1}{2}(\frac{Z}{\sigma})^2}, Z_0 = 0$$

where Z is the vertical distance relative to the center of the detector and $\sigma$ is the effective width of the Gaussian function.

6. The method of claim 1 wherein the inverse cusp function is a three point deconvolution filter characteristic of said cusp function.

* * * * *